Figure 1:
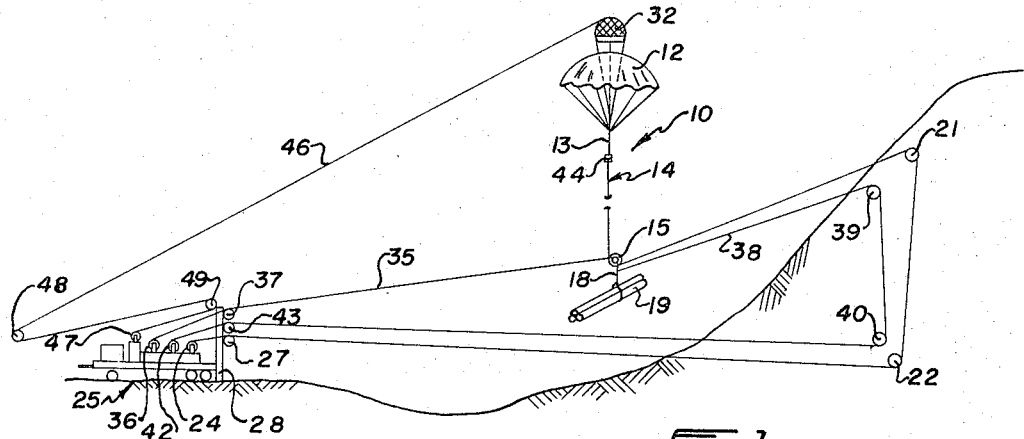

Oct. 10, 1967  T. E. PELTON ETAL  3,346,127
DRAG UTILIZING TRANSPORTING APPARATUS
Filed March 14, 1966  2 Sheets-Sheet 1

INVENTORS
THOMAS E. PELTON
NORMAN R. PELTON
BY
Fetherstonhaugh & Co.

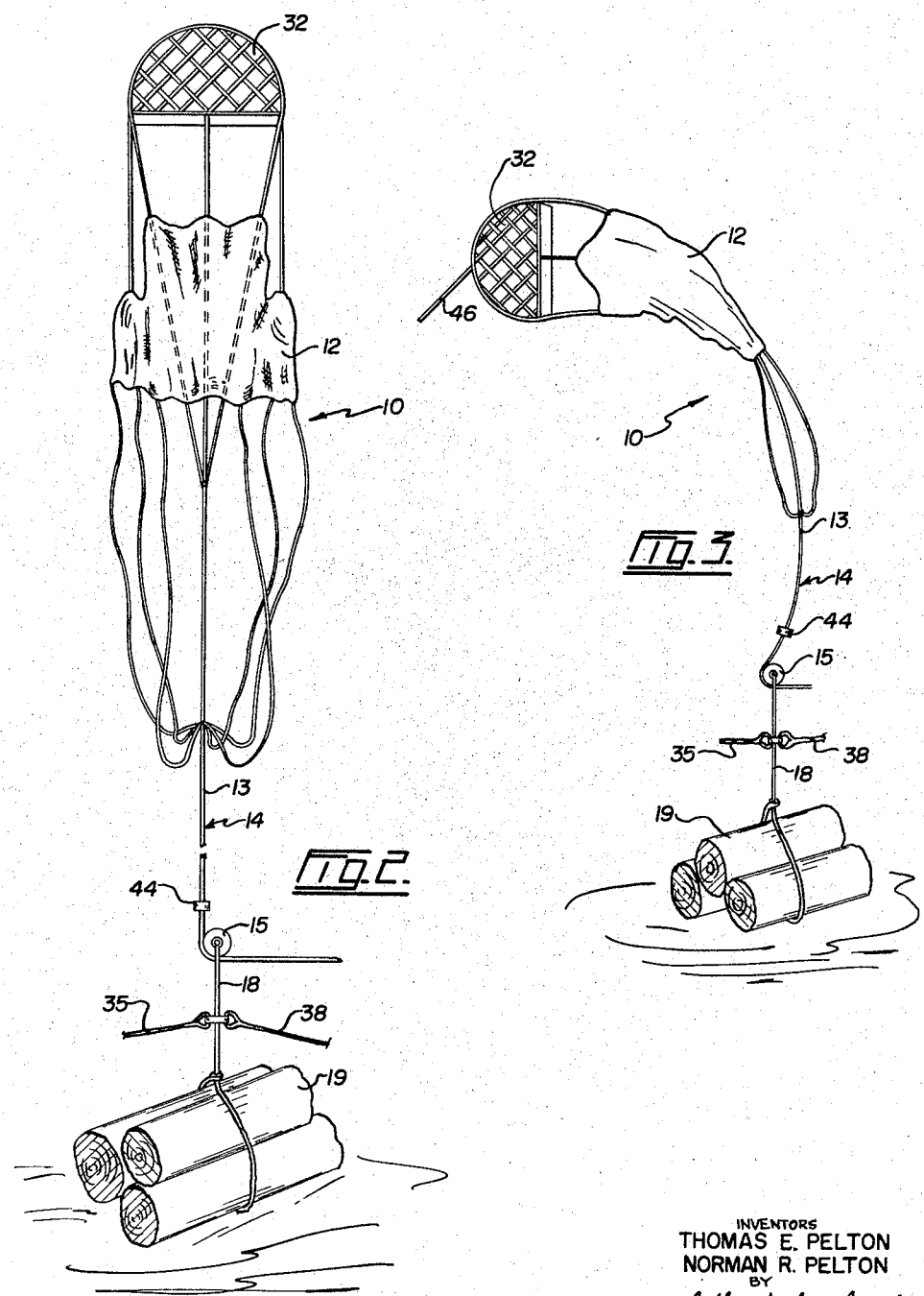

United States Patent Office 3,346,127
Patented Oct. 10, 1967

3,346,127
DRAG UTILIZING TRANSPORTING APPARATUS
Thomas E. Pelton, 12138 York Ave., and Norman R. Pelton, 12127 York Ave., both of Haney, British Columbia, Canada
Filed Mar. 14, 1966, Ser. No. 533,934
13 Claims. (Cl. 212—71)

This invention relates to apparatus for lifting and transporting loads by the utilization of drag force.

Although this apparatus may be used for lifting and transporting loads of all kinds, and particularly heavy loads, it is primarily designed for use in the logging industry and, for the sake of convenience, will be described herein in connection with the yarding of logs in the forest. Again, the apparatus is useful over any type of terrain, but it is particularly useful over rough or uneven ground, and for side hill logging.

The use of balloons in the yarding or moving of logs has been developed in recent years. The balloon logging systems have the following advantages over the established methods of yarding: ground conditions and the density of the timber stand have little effect on the yarding production; breakage of the timber is reduced; yarding speed is increased and longer distances can be yarded from each setting; fewer roads are required in a given area; smaller cables can be used; and less damage is caused to the soil and the second growth timber.

On the other hand, balloon logging has the following disadvantages: high initial cost of the balloon envelope and the helium gas required; risk of losing a large investment by the balloon escaping or being punctured; high static lift when no load is being carried causes problems and is a hazard to the workmen during the hooking and unhooking of loads; leakage of expensive helium through large surface of balloon envelope; and the problems of training personnel to handle the large investment, to protect it during high winds, and to apply it effectively on a high production basis.

The present apparatus retains the benefits of the balloon logging apparatus, while eliminating or reducing the disadvantages thereof. The apparatus of this invention utilizes drag force in order to lift and transport loads. Drag is created by suitable means such as a substantially flat kite-like apparatus, or a parachute, which is connected to the load by suitable cable means. A balloon is connected to the drag means, and as it needs to have only sufficient lift to raise the latter above the load to be transported, it is very much smaller than a balloon which would be required to lift the total load. The initial cost of this apparatus is considerably less than that of balloon logging apparatus for transporting similar loads; less helium is required and helium leakage is reduced because of the smaller balloon; the degree of lift can be increased or decreased by respectively increasing or decreasing the speed with which the drag means is moved through the air during the lifting operation; the lift of a given apparatus can be increased by using a parachute of larger diameter; and the small balloon is easier to handle in winds and during non-use periods. The load line connected to the logs is maintained under tension the entire time during each lifting and transporting operation.

Figure 5:
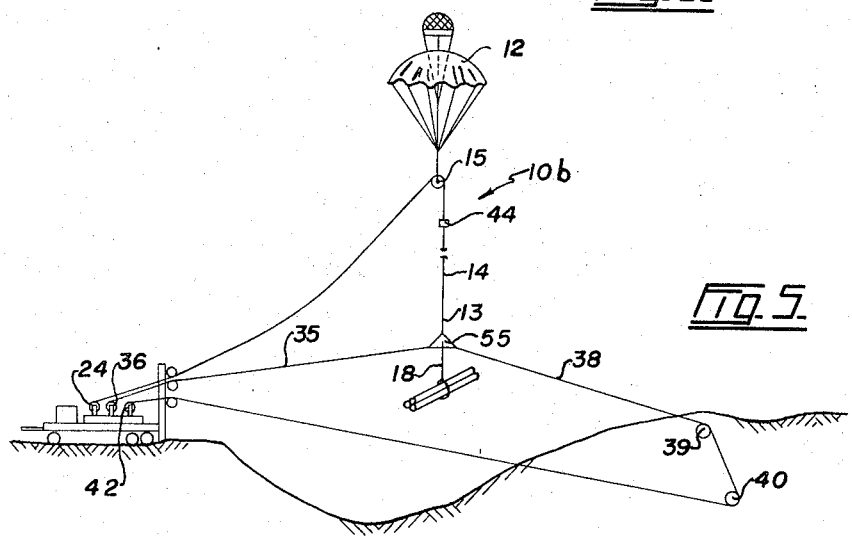
Figure 4:
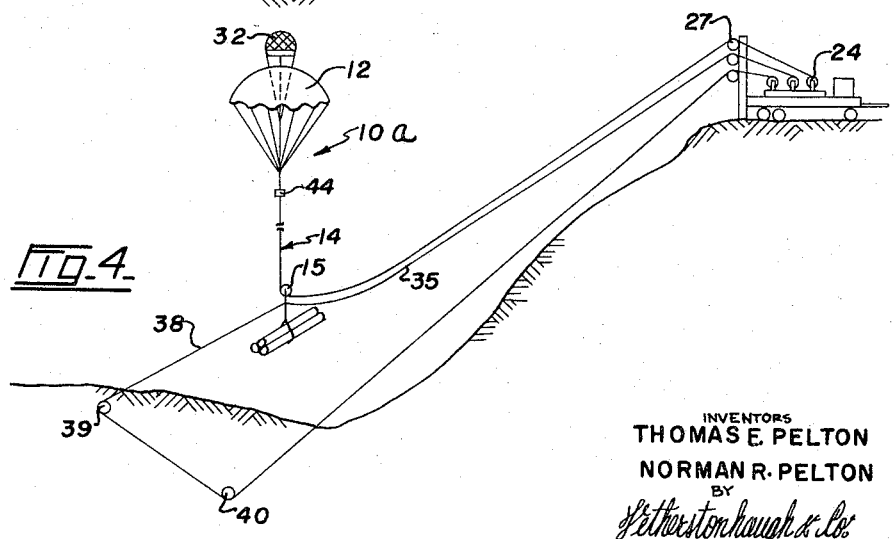

Examples of the present apparatus are diagrammatically illustrated in the accompanying drawings, in which, FIGURE 1 diagrammatically illustrates a preferred form of apparatus according to the present invention, said apparatus being in operation and moving a load, FIGURE 2 is a view of the main part of the apparatus of FIGURE 1 at rest, FIGURE 3 shows the apparatus of FIGURE 1 at rest and tipped into a position heading into the wind, FIGURE 4 illustrates an alternative form of apparatus which is slightly different than that of FIGURE 1, and FIGURE 5 illustrates another alternative form of transporting apparatus.

Referring to FIGURES 1, 2 and 3, 10 is lifting and transporting apparatus according to this invention which includes drag means in the form of a parachute 12 connected to the end 13 of a skyline cable 14 which is threaded through a block 15 to which suitable securing means is connected by means of which a load can be connected to the block and is adapted to be connected or secured to a load 19 in any desired or convenient manner. If the load is a log or bundle of logs, cable 18 can be in the form of a standard choker line or it may have tongs connected thereto.

After being threaded through block 15, skyline 14 extends away from the load and is threaded through one or more tail blocks, in this example, blocks 21 and 22. From these blocks, the skyline cable extends back to a power operated drum 24 of a winch 25. If desired, cable 14 can extend over a block 27 mounted on a suitable tower or spar tree 28 before it reaches drum 24.

A balloon 32 is connected to parachute 12 in any convenient manner, but so as not to interfere with the proper operation of said parachute. Any suitable gas, such as helium, is used in this balloon. The balloon needs to be only of such size as to provide enough lift to raise parachute 12, the portion of skyline 14 extending downwardly therefrom, and block 15, the size of the balloon not having any relationship to the load to be lifted other than the fact that the size of the parachute is relative to this load and the balloon has to be able to raise said parachute. If desired, the balloon can be such as to provide more lift than is required, in order to make the apparatus as stable as possible in wind.

Suitable means in provided for controlling the movement of block 15 and any load attached thereto. Suitable cable means is connected to the block for this purpose. In this example, a main line 35 is connected to the block or load cable 18 and extends away therefrom in a direction opposite to that of the portion of cable 14 which extends from said block to tail block 21. Main line 35 extends to and is wound on a power-operated drum 36 of winch 25, and can extend over a block 37 on tower 28. In this example, said cable means also includes a haulback line 38 which is connected to block 15 or the load cable and extends away therefrom and from main line 35 to one or more tail blocks, in this example, tail blocks 39 and 40. This haulback line extends from block 40 to another power-operated drum 42 on the winch. If desired, the haulback line can extend over a block 43 on tower 28. Alternatively, haulback line 38 may be omitted, in which case, it is preferable to fix on line 14 spaced below parachute 12 a stop 44 that cannot pass through block 15. However, this stop is not required when line 38 is provided.

Apparatus 10 is improved by the provision of a straw line 46 which is connected to balloon 32, preferably at the top thereof, and extends either directly to a power-operated drum 47 of winch 25 or indirectly thereto through a suitably-located block 48 spaced outwardly from the winch and another block 49 on tower 28.

In order to use apparatus 10, block 15 is moved to the position of load 19 by means of lines 35 and 38, one being paid out and the other reeled in in order to accomplish this. Then skyline 14 is released or paid out, at which time, balloon 32 raises parachute 12 to a position above the load, as shown in FIGURE 2. At this time, the parachute is inoperative and the upward force need only be sufficient to raise the parachute, the portion of line 14 between the latter and block 15, and said block. Tail block 39 and tower block 37 have to be so located relative to the area where loads are to be picked up that when lines 35 and 38 are reeled in, block 15 is pulled downwardly far enough to enable line 18 to be attached to the load. The load is lifted by holding line 35 and reeling in skyline 14 at sufficient speed to cause parachute 12 to move downwardly, open and produce a drag-force or resistance as it is pulled through the air, thereby applying a lift-force to the load. The load can be completely lifted from the ground, or partially lifted therefrom so that it can be drawn over the ground. The degree of lift is controlled by the speed of the reeling in of line 14. Line 35 is reeled in while line 38 is paid out so that the load is moved in a substantially horizontal direction towards tower 28. A regenerative brake winch would be very helpful for reeling in and paying out the lines. Skyline 14 can be stopped at this time, or it can be reeled in to increase the downward pull on the parachute, thereby increasing the degree of lift on the load. The skyline can be slackened at the same speed as the reeling in of the main line so that the parachute will remain substantially at the same height, line 35 being reeled in fast enough to provide the necessary drag. When main line 35 is being reeled in, parachute 12 is moved at an angle to the ground rather than straight down towards the latter, and it tends to plane or act somewhat like a kite. Although a collapsible parachute is preferred so that it causes very little trouble in winds when it is not actually operating as a drag, an umbrella type of parachute which is always open can be used, or a substantially flat member can be used, said member being held in a substantially horizontal position when it is moved downwardly, and acting somewhat as a kite when it is drawn downwardly and horizontally relative to the ground.

If the required movement of the load towards the tower is too long for skyline 14, the load can be stopped and held in position while the skyline is released to allow the balloon to raise the parachute back to its starting position. Then the operation is repeated.

If haulback line 38 is omitted, skyline cable 14 can be used to pull block 15 outwardly from the winch to the loading position. When stop 44 engages block 15 as cable 14 is reeled in, the block moves with said cable. The block is moved towards the ground at this time by reeling in cables 14 and 35.

If a wind is blowing, line 14 can be slacked off a little and straw line 46 held, or said line 46 can be reeled in a little. In either case, the balloon tends to roll as the parachute moves to the position shown in FIGURE 3 so that the balloon-parachute combination is in a somewhat streamline shape and therefore offers less resistance to the wind at this time. This results in less horizontal drag force on the balloon and parachute apparatus when not being used in lifting and transporting, and even in fairly high winds the apparatus can be held almost directly above block 15. In addition to this, the wind cannot blow into the parachute to cause a high horizontal drag, and the straw line acts as a safety line for the balloon and parachute.

Apparatus 10a of FIGURE 4 is only slightly different from apparatus 10. With apparatus 10a, tail blocks 21 and 22 have been eliminated. Skyline 14 is threaded through block 15 and extends away therefrom and from haulback line 38 through tower block 27 and to drum 24. This apparatus functions in the same manner as apparatus 10, excepting that skyline 14 and main line 35 both have to be reeled in when the load is being transported.

If desired, main line 35 can be omitted from apparatus 10a. In this case, line 14 moves the load towards the winch when haulback line 38 is paid out to enable this action to take place. If the forward pull at this time is not sufficient to move the load, stop 44 engages block 15 so that line 14 applies a direct pull thereto. Stop 44 when in engagement with block 15 also makes it possible to pull said block towards the ground by reeling in both lines 14 and 38.

Apparatus 10b functions in the same manner as the previously described apparatus. The main difference is that in apparatus 10 and 10a, block 15 is connected to load cable 18, and the end of skyline 14 is connected to parachute 12, while in apparatus 10b, block 15b is connected to parachute 12, and the end 13 of skyline 14 is connected to load line 18 in any suitable manner, such as by a connector 55. Main line 35 and haulback line 38 are connected to this connector 55. Although a stop 44b may be applied to line 14, in which case it would be near connector 55 as shown, the stop is not as useful as in the previously described embodiments of the invention. If stop 44b is provided, main line 35 can be omitted.

Apparatus 10b functions in the same manner as the previously described apparatus. Load line 18 is shifted horizontally by main line 35 and haulback 38, and it is moved towards the ground and allowed to move away therefrom by these lines. The reeling in of skyline 14 draws parachute 12 downwardly to create the drag-force which lifts the load connected to line 18. When it is desired to move the load horizontally, skyline 14 and main line 35 are reeled in, while haulback line 38 is paid out.

The apparatus according to this invention is very simple. Most of the equipment used is readily available in the logging industry. The lines or cables and the men working with them are not working against a lifting force sufficient to lift the maximum load to be handled by the apparatus, as is the case with prior balloon apparatus. Parachute 12 functions only when it is required for providing sufficient drag-force to lift the load. Loads of different sizes can be handled by changing the speed of pulling the parachute downwardly and/or by manipulating the main line and the haulback line. If there is a relatively drastic change in the size of the loads to be transported, a parachute of a different size can be used.

What we claim as our invention is:

1. Apparatus for lifting and transporting loads by the utilization of drag force, comprising drag means adapted to create drag when drawn through the air proportional to the speed of movement thereof through the air, securing means adapted to be connected to a load, a block element, a skyline cable element threaded through the block element, one of said elements being connected to said drag means and the other of said elements being connected to said securing means, power means connected to the skyline cable element to haul in and pay out said skyline cable element, balloon means connected to said drag means and having sufficient left to raise the drag means, said drag means when the cable element is hauled in being drawn through the air and creating sufficient drag at least partially to lift a load connected to said securing means, and control means connected to said securing means for controlling the movement of the securing means.

2. Apparatus as claimed in claim 1 in which said drag means comprises a parachute.

3. Apparatus as claimed in claim 1 in which said control means is a cable connected to said securing means and to power means so that said cable can be hauled in and paid out, said cable being positioned to work against any pull on the skyline cable means.

4. Apparatus as claimed in claim 3 including a stop fixed to the skyline cable and spaced away from the parachute.

5. Apparatus as claimed in claim 1 in which said block element and the cable element are respectively connected to the securing means and said drag means.

6. Apparatus as claimed in claim 1 in which said block element and the cable element are respectively connected to said drag means and the securing means.

7. Apparatus as claimed in claim 1 including a line connected to the balloon means by means of which said balloon means can be shifted substantially horizontally.

8. Apparatus for lifting and transporting loads by the utilization of drag force, comprising securing means adapted to be connected to a load, a control cable connected to said securing means and extending away therefrom in opposite directions, power means connected to ends of the control cable to haul in and pay out said cable, a block connected to the securing means, a skyline cable threaded through the block, power means connected to an end of the skyline cable to haul in and pay out the latter, drag means connected to an opposite end of the skyline cable and adapted to create drag when drawn through the air by said skyline cable, and balloon means connected to said drag means and having sufficient lift to raise the drag means when the skyline cable is released, said drag means when the skyline cable is hauled in being drawn through the air and creating sufficient drag at least partially to lift a load connected to said securing means.

9. Apparatus as claimed in claim 8 in which the drag means comprises a parachute.

10. Apparatus as claimed in claim 8 including a line connected to the balloon means by means of which said balloon means can be shifted substantially horizontally.

11. Apparatus for lifting and transporting loads by the utilization of drag force, comprising securing means adapted to be connected to a load, a control cable connected to said securing means and extending away therefrom in opposite directions, power means connected to ends of the control cable to haul in and pay out said cable, drag means adapted to create drag when drawn through the air, a block connected to said drag means, a skyline cable threaded through the block, power means connected to an end of the skyline cable to haul in and pay out the latter, an opposite end of the skyline cable being connected to said securing means, and balloon means connected to said drag means and having sufficient lift to raise the drag means when the skyline cable is released, said drag means when the skyline cable is hauled in being drawn through the air and creating sufficient drag at least partially to lift a load connected to said securing means.

12. Apparatus as claimed in claim 11 in which the drag means comprises a parachute.

13. Apparatus as claimed in claim 11 including a line connected to the balloon means by means of which said balloon means can be shifted substantially horizontally.

References Cited

UNITED STATES PATENTS

| | | | |
|---|---|---|---|
| 3,249,237 | 5/1966 | Stewart | 212—89 |
| 3,270,895 | 9/1966 | Stewart | 212—71 |

FOREIGN PATENTS 165,262  11/1958  Sweden.

OTHER REFERENCES

Giant Balloons May Change Course of Logging Industry; vol. 23, No. 6, The Wingfoot Clan, Goodyear Aerospace Corp., Mar. 12, 1964.

ANDRES H. NIELSEN, *Primary Examiner.*